United States Patent Office 3,189,594
Patented June 15, 1965

3,189,594
HETEROGENEOUS COBALT COMPLEX
COMPOUNDS
Reinhard Neier, Basel, Switzerland, assignor to
Sandoz Ltd., Basel, Switzerland
No Drawing. Filed Apr. 1, 1963, Ser. No. 269,709
Claims priority, application Switzerland, Apr. 11, 1962,
4,432/62
6 Claims. (Cl. 260—145)

This invention relates to heterogeneous cobalt complex compounds of monoazo dyes, one of the said monoazo dyes being of the formula

[Structure I: benzene ring with OH, X, NO₂ substituents, linked via —N=N— to naphthalene ring with NH₂ and SO₂—NH—CH₂—CH(OH)—CH₃] (I)

wherein X represents hydrogen, halogen, alkyl or alkoxy and the NH₂— group is in the adjacent position to the —N=N— group, and the other monoazo dye being a member of the ortho,ortho'-dihydroxy-benzene-azonaphthalene series, preferably a member of the ortho,ortho'-dihydroxy-benzene-azonaphthalene series of the formula

[Structure II: benzene ring with OH, V, Y, Z substituents linked via —N=N— to naphthalene with OH and W] (II)

wherein
V, Y and Z represents hydrogen, halogen, alkyl, alkoxy, nitro, or sulfonic acid amide which may be further substituted and
W represents hydrogen or carboxylic acid amide which may be further substituted,
the monoazo dye of Formula II containing not more than two alkoxy-, nitro- or sulfonic-acid amide groups, and cobalt, less than two cobalt atoms being in complex combination with two molecules of azo compound.

These new heterogeneous cobalt complex compounds can conveniently be prepared by treating monoazo dyes in substance or on the fiber with a cobalt-yielding agent, one of the said dyes being of the formula

[Structure I repeated] (I)

wherein X represents hydrogen, halogen, alkyl or alkoxy and the NH₂ group is in the adjacent position to the —N=N— group, and the other dye being a member of the ortho,ortho'-dihydroxy-benzene-azonaphthalene series, preferably a member of the ortho,ortho'-dihydroxy-benzene-azonaphthalene series of the formula

[Structure II repeated] (II)

wherein
V, Y and Z represents hydrogen, halogen, alkyl, alkoxy, nitro, or sulfonic acid amide which may be further substituted and
W represents hydrogen or carboxylic acid amide which may be further substituted, the monoazo dye of Formula II containing not more than two alkoxy-, nitro- or sulfonic-acid amide groups, so that a mixture of cobalt-containing monoazo dyes is formed in which less than two cobalt atoms are in complex combination with two molecules of monoazo compound.

The metallizing reaction is preferably performed in such a way that an amount of a cobalt-yielding agent containing less then two but at least one cobalt atom acts upon two molecules of the azo compound. The reaction is conducted preferably in an aqueous, alkaline or organic medium to which the metal compound is added in the presence of compounds which maintain the metal dissolved in complex combination in caustic-alkaline medium, e.g. tartaric, citric or lactic acid.

Cobaltous formate, cobaltous acetate and cobaltous sulfate are examples of suitable cobalt compounds.

Especially valuable heterogeneous cobalt complex compounds are obtained when two monoazo compounds containing two groups capable of metal complex formation, of which at least one is a monoazo compound of the Formula I and the other an ortho,ortho'-dihydroxy compound of the benzene-azo-naphthalene series which may be substituted, e.g. a mixture of two monoazo compounds having the formulae:

[Structure: O₂N-benzene(OH)-N=N-naphthalene(NH₂)-SO₂—NH—CH₂—CH(OH)—CH₃]

and

[Structure: O₂N-benzene(OH)-N=N-naphthalene(OH)]

or a mixture of the two monoazo compounds of the formulae:

[Structure: O₂N-benzene(OH)-N=N-naphthalene(NH₂)-SO₂—NH—CH₂—CH(OH)—CH₃]

and

[Structure: Cl-benzene(OH)-N=N-naphthalene(OH)]

are treated with a cobalt-yielding agent.

The mixing ratio of any one of the dyes of Formula I and of a monoazo dye of the ortho,ortho'-dihydroxybenzene-azonaphthalene series may be varied within wide limits. In most cases equimolar amounts of the two dyes are jointly metallized, though mixtures containing 20–80 mol-percent of a dye of Formula I can be used.

The cobalt complex compounds formed are precipitated from the aqueous medium with salt, filtered off, washed if necessary, and dried.

Cobalt complexing of two monoazo compounds containing groups capable of metal complex formation, of which at least one is a monoazo compound of Formula I, yields valuable heterogeneous cobalt complex dyes whose shades and dyeing properties can be largely adjusted to a special use by changing the mixture of azo compounds.

The heterogeneous cobalt-containing azo dyes produced in substance or on the fiber are well soluble in water and dye wool, silk, leather and polyamide fibers from neutral to weakly acid dyebaths in grey, blue and brown shades having good light fastness and good wet fastness properties, e.g. fastness to washing, water, sea water, perspiration, carbonizing, bleaching, milling, rubbing, pressing, acids, alkalis, stoving and cross-dyeing. Other notable features of the dye are their slight sensitivity to hard water and their suitability for high-temperature dyeing. The heterogeneous cobalt-containing dyes produced in substance are also well soluble in polar solvents, e.g. ketones, alcohols and acetic acid alkyl esters etc., e.g. glycols, ethanol, acetone, acetic acid ethyl ester, propionic acid ethyl ester, amyl acetate etc. They are therefore well suitable for the dyeing and printing of leather, of fiber-forming materials in solution in organic solvents, and of plastics and lacquers, in which materials they give grey, blue and brown shades of good light and wet fastness properties.

In the following examples the parts and percentages are by weight and the temperatures in degrees centigrade.

EXAMPLE 1

22.3 parts of the dye produced by coupling diazotized 2-amino-1-hydroxy-5-nitrobenzene with 2-aminonaphthalene-6-sulfonic acid-(2'-hydroxy)-propylamide in acid medium and 15.5 parts of the dye formed by coupling of diazotized 2-amino-1-hydroxy-5-nitrobenzene and 2-hydroxynaphthalene in alkaline medium, are dissolved in 1000 parts of water at 70° containing 15 parts of sodium hydroxide. A solution of 14.1 parts of crystallized cobaltous sulfate and 3.7 parts of tartaric acid in 100 parts of water is added. The reaction mass is stirred at 70° until the metal-free starting dyes are no longer indicated. The cobalt-containing dye formed is precipitated by the addition of sodium chloride, filtered off, dried and ground. It is obtained as a dark powder which dyes wool, silk, leather and polyamide fibers in blue shades. Owing to its good solubility in organic solvents such as ketones, alcohols and acetic acid alkyl esters, it is also suitable for the dyeing of organic fiber-forming materials spun from solution in these solvents, e.g. cellulose acetate and polyacrylonitrile. It can be used further for the coloration of plastics and lacquers, e.g. vinyl and nitrocellulose lacquers, in blue shades.

In the following table the structure of some further heterogeneous cobalt complex dyes is shown. In column (I) is listed the amount of the first monoazo dye used, in column (II) its structural constitution is given, in column (III) the amount of the second monoazo dye used, in column (IV) its composition, and in column (V) the shade of the dyeing of the cobalt complex dye on wool.

Table

| Example No. | Parts (I) | Monoazo compound of formula (I) (II) | Parts (III) | Metallisable azo compound of any desired constitution (IV) | Shade of dyeing on wool (V) |
|---|---|---|---|---|---|
| 2 | 22.3 | 2-amino-1-hydroxy-5-nitrobenzene→2-aminonaphthalene-6-sulfonic acid-(2'-hydroxy)-propylamide. | 14.9 | 2-amino-1-hydroxy-4-chlorobenzene→2-hydroxynaphthalene. | Blue-violet. |
| 3 | 22.3 | 2-amino-1-hydroxy-4-nitrobenzene→1-aminonaphthalene-4-sulfonic acid (2'-hydroxy)-propylamide. | 26.9 | 2-amino-1-hydroxybenzene-4-sulfonic acid-(2'-carboxy)-phenylamide→7-hydroxy-1-acetylaminonaphthalene. | Grey-violet. |
| 4 | 24 | 2-amino-1-hydroxy-4-chloro-5-nitrobenzene→2-aminonaphthalene-5-sulfonic acid-(2'-hydroxy)-propylamide. | 15.5 | 2-amino-1-hydroxy-5-nitrobenzene→2-hydroxynaphthalene. | Blue. |
| 5 | 23 | 2-amino-1-hydroxy-4-nitro-6-methylbenzene→1-aminonaphthalene-5-sulfonic acid-(2'-hydroxy)-propylamide. | 20.8 | 2-amino-1-hydroxybenzene-4-sulfonic acid-(3'-methoxy)-propylamide→2-hydroxynaphthalene. | Reddish grey. |
| 6 | 22.3 | 2-amino-1-hydroxy-5-nitrobenzol→2-aminonaphthalene-5-sulfonic acid-(2'-hydroxy)-propylamide. | 16.5 | 2-amino-1-hydroxy-4-chloro-5-nitrobenzene→2-hydroxynaphthalene. | Blue. |
| 7 | 22.3 | ----do---- | 25 | 2-amino-1-hydroxy-5-nitrobenzene→2-hydroxynaphthalene-3-carboxylic acid-(3'-sulfamido)-phenylamide. | Do. |
| 8 | 23.7 | 2-amino-1-hydroxy-4-methoxy-5-nitrobenzene→2-aminonaphthalene-6-sulfonic acid-(2'-hydroxy)-propylamide. | 18.3 | 2-amino-1-hydroxy-3,4,6-trichlorobenzene→2-hydroxynaphthalene. | Do. |
| 9 | 33.4 | 2-amino-1-hydroxy-5-nitrobenzene→1-aminonaphthalene-4-sulfonic acid-(2'-hydroxy)-propylamide. | 7.5 | 2-amino-1-hydroxy-benzene→2-hydroxynaphthalene. | Do. |
| 10 | 29.6 | ----do---- | 9.4 | 2-amino-1-hydroxy-4-methylbenzene→2-hydroxynaphthalene. | Do. |
| 11 | 22.3 | ----do---- | 14.7 | 2-amino-1-hydroxy-4-methoxybenzene→2-hydroxynaphthalene-3-carboxylic acid-phenylamide. | Do. |
| 12 | 22.3 | 2-amino-1-hydroxy-4-nitro-6-bromobenzene→1-aminonaphthalene-5-sulfonic acid-(2'-hydroxy)-propylamide. | 16.6 | 2-amino-1-hydroxy-4-bromobenzene→2-hydroxynaphthalene. | Do. |
| 13 | 22.3 | 2-amino-1-hydroxy-5-nitrobenzene→2-aminonaphthalene-5-sulfonic acid-(2'-hydroxy)-propylamide. | 20.1 | 2-amino-1-hydroxybenzene-4-sulfonic acid methylamide→2-hydroxynaphthalene-3-carboxylic acid-methylamide. | Violet. |
| 14 | 33.4 | ----do---- | 13.4 | 2-amino-1-hydroxybenzene-4-sulfonic acid-amide→2-hydroxynaphthalene-3-carboxylic acid-amide. | Blue. |
| 15 | 24 | 2-amino-1-hydroxy-4-chloro-5-nitrobenzene→1-aminonaphthalene-4-sulfonic acid (2'-hydroxy)-propylamide. | 16 | 2-amino-1-hydroxy-4-tert.butylbenzene→2-hydroxynaphthalene. | Violet-blue. |
| 16 | 36 | 2-amino-1-hydroxy-4-chloro-5-nitrobenzene→1-amino-naphthalene-4-sulfonic acid-(2'-hydroxy)-propylamide. | 12.4 | 2-amino-1-hydroxy-4-chlorobenzene-5-sulfonic acid phenylamide→2-hydroxynaphthalene-3-carboxylic acid-amide. | Blue. |
| 17 | 36 | ----do---- | 8.1 | 2-amino-1-hydroxy-4-ethoxybenzene→2-hydroxynaphthalene. | Do. |
| 18 | 24 | ----do---- | 22.4 | 2-amino-1-hydroxy-4,6-dinitrobenzene→2-hydroxynaphthalene-3-carboxylic acid-(2'-hydroxy)-propylamide. | Blue-grey. |
| 19 | 24 | 2-amino-1-hydroxy-4-chloro-5-nitrobenzene→1-aminonaphthalene-5-sulfonic acid (2'-hydroxy)-propylamide. | 18.9 | 2-amino-1-hydroxy-4,6-dichlorobenzene→2-hydroxy-6-methoxynaphthalene. | Blue. |
| 20 | 36 | ----do---- | 12.7 | 2-amino-1-hydroxy-5-nitrobenzene→2-hydroxynaphthalene-3-carboxylic acid phenylamide-3'-sulfonic acid. | Do. |

DYEING EXAMPLE A 1 part of the dye obtained according to Example 1 is dissolved in 4000 parts of water at 40–50° C. 100 parts of previously wetted wool are entered into this solution and 2 parts of acetic acid are added dropwise; then the bath is heated to 100° over 30 minutes and held at this temperature for 1 hour. The dyed wool is removed from the bath, rinsed with water and dried. A blue dyeing is obtained which has excellent fastness to light, washing, milling and perspiration.

DYEING EXAMPLE B 100 parts of secondary cellulose acetate with a content of 54–55% splittable acetic acid are dissolved in 300 parts of solvent, e.g. a mixture of 275 parts of acetone and 25 parts of methanol, and the solution left overnight to swell.

1 part of the dye obtained according to Example 1 is dissolved in the same solvent mixture. This solution is added to the cellulose acetate solution and the whole stirred until 60 parts of solvent have evaporated. The solution is filtered through cotton and a filter press and spun as filament in the same way as uncoloured cellulose acetate dope. The filament is dyed to a fast blue shade.

DYEING EXAMPLE C

A lacquer is prepared with 20 parts of the vinyl chloride-vinyl acetate copolymer composition "Vinylite VMCH" (registered trademark of Union Carbide Corporation), 70 parts of methylethyl ketone and 10 parts of ethylene glycol. 0.5 part of the cobalt-containing dye obtained according to Example 1 is stirred into 10 parts of this lacquer and diluted with 25 parts of a 1:1 mixture of methylethyl ketone and cyclohexanone. The colored lacquer is applied to aluminum foil and air dried. It is of blue color and has good light fastness.

DYEING EXAMPLE D

A dyebath is prepared with 0.1 part of the monoazo dye produced from diazotized 2-amino-1-hydroxy-4-nitrobenzene by coupling in acid medium with 1-aminonaphthalene-4-sulfonic acid-(2'-hydroxy)-propylamide, 0.1 part of the monoazo dye obtained by coupling diazotized 2-amino-1-hydroxybenzene-4-sulfonic acid-(2'-carboxy)-phenyl amide with 7-hydroxy-1-acetylaminonaphthalene in alkaline medium, 0.4 part of ammonium sulfate, 0.1 part of cobaltous sulfate and 1000 parts of water. 10 parts of wetted-out wool are entered into the bath at 40°. The temperature is increased to 100° in 20 minutes and this temperature maintained for 1 hour. During dyeing 2 parts of 10% acetic acid are added dropwise and the evaporated water is replaced from time to time. On completion of dyeing the wool is removed, rinsed and dried. It is dyed to a violet-grey shade.

Nylon and other polyamide fibers are dyed in the same way as wool. Silk also is dyed like wool except that the temperature of the dyebath is not allowed to exceed 90°. Leather and paper are dyed by the methods normally used in practice.

Formulae of representative dyes of the foregoing Examples are as follows:

EXAMPLE 1

The 1:2 heterogeneous cobalt mixed complex compounds obtained from the mixture of the monoazo dyes of the formula

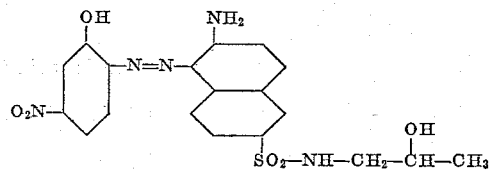

and

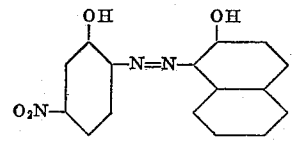

in the metal complex form

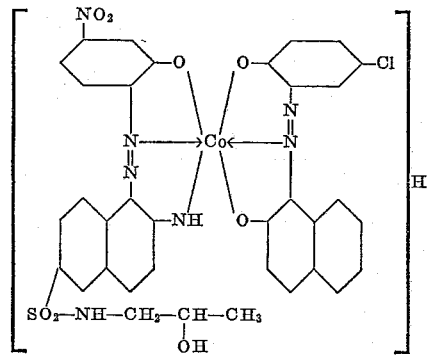

EXAMPLE 2

The 1:2 heterogeneous cobalt mixed complex compounds obtained from the mixture of the monoazo dyes of the formula

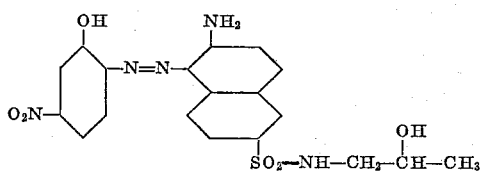

and

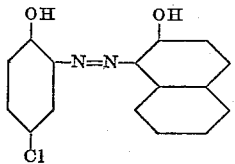

in the metal complex form

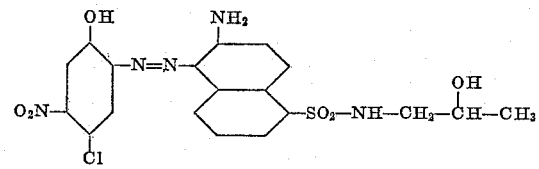

EXAMPLE 4

The 1:2 heterogeneous cobalt mixed complex compounds obtained from the mixture of the monoazo dyes of the formula

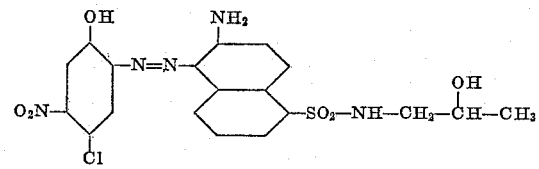

and

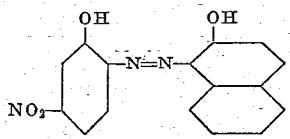

in the metal complex form

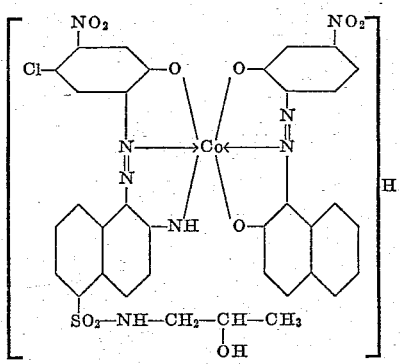

EXAMPLE 6

The 1:2 heterogeneous cobalt mixed complex compounds obtained from the mixture of the monoazo dyes of the formula

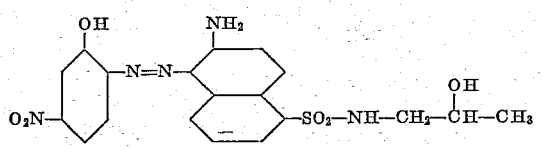

and

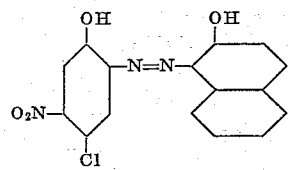

in the metal complex form

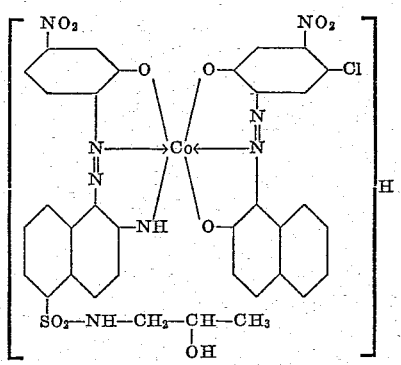

EXAMPLE 7

The 1:2 heterogeneous cobalt mixed complex compounds obtained from the mixture of the monoazo dyes of the formula

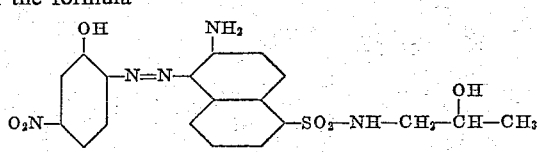

and

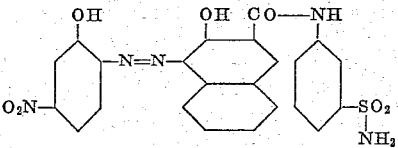

in the metal complex form

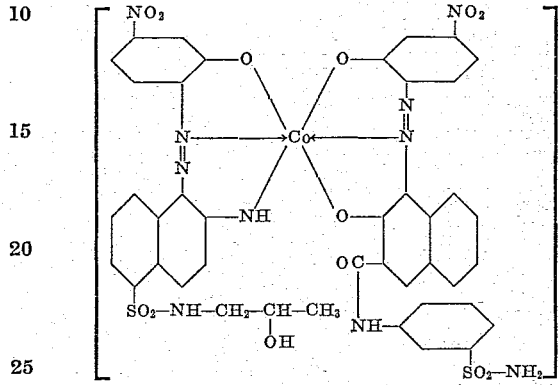

Having thus disclosed the invention what I claim is:
1. A 1:2-heterogeneous cobalt mixed complex of the formula

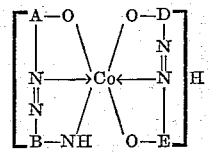

wherein
A is a member selected from the group consisting of radicals of diazotized
2-amino-1-hydroxy-5-nitrobenzene,
2-amino-1-hydroxy-4-nitrobenzene,
2-amino-1-hydroxy-5-nitro-chlorobenzene,
2-amino-1-hydroxy-4-nitro-lower alkyl-benzene,
2-amino-1-hydroxy-5-nitro-lower alkoxy-benzene, and
2-amino-1-hydroxy-4-nitro-bromobenzene,
B is a member selected from the group consisting of radicals of
2-amino-naphthalene-6-sulfonic acid-(2'-hydroxy)-propylamide,
1-aminonaphthalene-4-sulfonic acid (2'-hydroxy)-propylamide,
2-aminonaphthalene-5-sulfonic acid-(2'-hydroxy)-propylamide, and
1-aminonaphthalene-5-sulfonic acid-(2'-hydroxy)-propylamide,
and wherein the —O— group of the diazo component and the —NH— group of the coupling component each stands in the adjacent position to the —N=N— group, and the other monoazo radical being a monoazo dye radical of the ortho, ortho'-dihydroxybenzene-azonaphthalene series of the formula

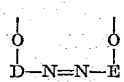

wherein
D is a member selected from the group consisting of the radicals of diazotized
2-amino-1-hydroxy-nitrobenzene,
2-amino-1-hydroxy-chlorobenzene,
2 - amino - 1 - hydroxybenzene-sulfonic acid-(carboxy)phenylamide,
2-amino - 1 - hydroxybenzene-sulfonic acid-(lower alkoxy)lower alkylamide,
2-amino-1-hydroxy-chloro-nitrobenzene, 2-amino-1-hydroxy-trichlorobenzene,
2-amino-1-hydroxybenzene,
2-amino-1-hydroxy-lower alkyl benzene,
2-amino-1-hydroxy-lower alkoxy benzene,
2-amino-1-hydroxy-bromobenzene,
2-amino-1-hydroxybenzene-sulfonic acid lower alkylamide,
2-amino-1-hydroxybenzene-sulfonic acid amide,
2 - amino - 1 - hydroxy-chlorobenzene-sulfonic acid phenylamide,
2-amino-1-hydroxy-dinitrobenzene, and
2-amino-1-hydroxy-dichlorobenzene, E is a member selected from the group consisting of the radicals of
2-hydroxynaphthalene,
7-hydroxy-1-acetylamino-naphthalene,
2-hydroxynaphthalene-3-carboxylic acid-(sulfamido)phenylamide,
2-hydroxynaphthalene - 3 - carboxylic acid-phenylamide,
2-hydroxynaphthalene-3-carboxylic acid-lower alkylamide,
2-hydroxynaphthalene-3-carboxylic acid amide,
2 - hydroxynaphthalene - 3 - carboxylic acid-(hydroxy)-lower alkylamide,
2-hydroxy-6-lower alkoxynaphthalene, and
2-hydroxynaphthalene-3-carboxylic acid phenylamide-sulfonic acid and wherein the —O— groups in the diazo and coupling component each stands in the adjacent position to the —N=N— group.

2. The 1:2 heterogeneous cobalt mixed complex of the formula

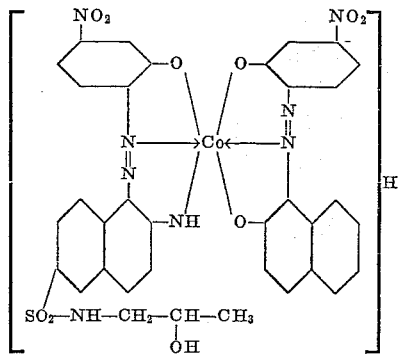

3. The 1:2 heterogeneous cobalt mixed complex of the formula

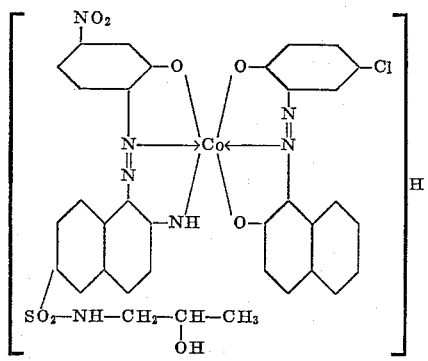

4. The 1:2 heterogeneous cobalt mixed complex of the formula

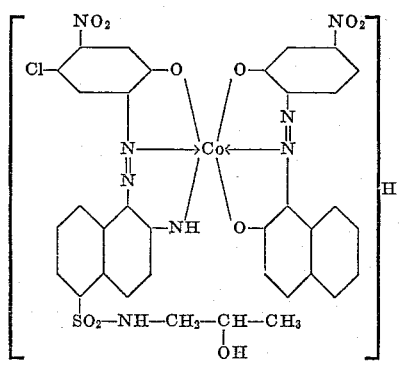

5. The 1:2 heterogeneous cobalt mixed complex of the formula

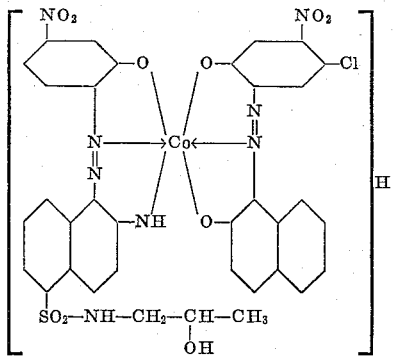

6. The 1:2 heterogeneous cobalt mixed complex of the formula

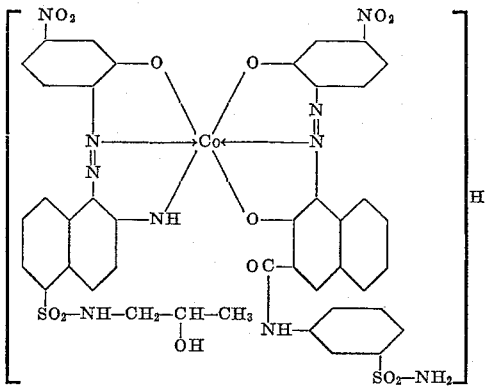

References Cited by the Examiner

UNITED STATES PATENTS 2,674,515  4/54  Widmer et al. _____ 260—151
2,839,520  6/58  Neier _____ 260—151 XR CHARLES B. PARKER, *Primary Examiner.*
IRVING MARCUS, *Examiner.*